United States Patent [19]

Dillman

[11] Patent Number: 4,561,821
[45] Date of Patent: Dec. 31, 1985

[54] PORTABLE SELF-ERECTING SURGE STORAGE SILO

[75] Inventor: Bruce Dillman, Cape Coral, Fla.

[73] Assignee: Bituma-Stor, Inc., Marquette, Iowa

[21] Appl. No.: 684,342

[22] Filed: Dec. 20, 1984

[51] Int. Cl.⁴ .............................................. B65G 67/08
[52] U.S. Cl. ..................................... 414/332; 414/919
[58] Field of Search .................... 414/332, 919; 52/64, 52/143, 194, 197; 222/160

[56] References Cited

U.S. PATENT DOCUMENTS

4,249,351  2/1981  Brock ............................... 414/332 X
4,465,420  8/1984  Dillman ............................... 414/332

Primary Examiner—Robert G. Sheridan
Attorney, Agent, or Firm—James E. Nilles; James R. Custin

[57] ABSTRACT

A portable self-erecting surge storage silo comprises a bin, a conveyor elevator and a base frame that supports the bin and elevator in operation and for transport. The bin has a pair of long rear legs and a pair of shorter front stub legs. At each side of the base frame is an L-shaped unit having a longer leg and a shorter leg, swingable about a horizontal first axis transverse to the base frame and through the junction of the legs of the L-unit. The shorter legs of the L-units are rigidly connected to the bin stub legs, substantially in alignment with them, for swinging of the bin between a horizontal transport position and an inclined intermediate position at which the rear bin legs are detachably connectable to the base frame for swinging of the bin about a second axis, parallel to the first. The shorter legs of the L-units are disconnected from the stub legs at the intermediate position, and the bin is swung up about the second axis to its upright erected position at which the longer legs of the L-units are connected to the stub legs to cooperate with the rear legs in supporting the bin. The bin is raised by means of a connection with the elevator, which is swung up by hydraulic jacks.

6 Claims, 8 Drawing Figures

PORTABLE SELF-ERECTING SURGE STORAGE SILO

FIELD OF THE INVENTION

This invention relates to portable self-erecting surge storage silos for paving mix aggregates and the like, of the kind comprising a bin that is supported on legs when in its operative condition, to be high enough for dump body vehicles to be driven under it for loading, and a conveyor elevator whereby materials are carried up to a fill inlet at the top of the bin; and the invention is more particularly concerned with a self-erecting surge storage silo assembly comprising a bin and a conveyor elevator, both of which are carried for transport on a single trailer-like unit that also serves as a base frame for the erected bin and elevator.

BACKGROUND OF THE INVENTION

U.S. Pat. No. 4,465,420, issued to this applicant, discloses a large capacity self-erecting portable silo assembly wherein the bin is transported on one trailer unit and a conveyor elevator for filling the bin has a wheeled truck under its charging end portion to comprise a second trailer unit. That patent points out the advantages of a self-erecting silo, which can be set up and taken down without the use of a crane.

The present invention relates to a portable self-erecting silo assembly of somewhat smaller capacity, having a bin and a conveyor elevator that can both be transported on a single trailer unit which also serves as a base frame for the erected silo.

U.S. Pat. No. 4,249,351 to J. D. Brock discloses such an assembly wherein the legs upon which the bin is supported in its erected position are pivotally connected to the bin and to the trailer unit bed, to swing between upright and horizontal positions. The legs remain parallel to one another as they swing down, so that the bin remains in an upright attitude in its transport position, and therefore it can have only a limited height—hence only a limited capacity—in order to be able to pass under bridges and overpasses when being transported along a highway.

The conveyor elevator in the assembly of the Brock patent is mounted on the same trailer bed that carries the bin. At the charging end of the elevator its frame has a pivot connection to the rear end of the trailer bed, to be swingable between a transport position in which the elevator is forwardly and upwardly inclined at a small angle to the horizontal and an operative position in which it has a steeper upward inclination. Links are connected between the elevator frame and the bin whereby the elvator is swung up to its operative position as the bin is raised to its erected position and is lowered with lowering of the bin. As the legs of the bin swing down towards their horizontal positions they are forwardly inclined, so that the bin is near the front of the trailer frame when it is in its transport position. However, the elevator is only a little shorter than the trailer frame, and therefore the side wall of the bin that faces the rear end of the trailer has a removable upper panel, to allow the upper end portion of the elevator to be received in the upper portion of the bin when the bin and the elevator are in their transport positions.

The portable silo of this prior patent was best suited for cooperation with a bin and elevator of relatively light construction. However, a satisfactory portable silo assembly, in addition to having an adequately large capacity, should be of sturdy construction and have a heavy-duty bin floor system, heavy-duty elevator chains and heavy bearings.

The bin of a silo assembly is substantially heavier than the elevator, and therefore provision for raising and controlledly lowering the bin presents a major problem. The assembly disclosed in the applicant's U.S. Pat. No. 4,465,420 comprises a hydraulic cylinder jack for raising the bin. As pointed out in that patent, a hydraulic cylinder jack mechanism is a practical expedient for lifting a heavy surge silo bin, but only if it is not required to have an unduly long extension and retraction stroke. This limitation to short-stroke jacks is in apparent conflict with the need for raising the bin to a substantial elevation, as demonstrated by the earlier U.S. Pat. No. 3,934,739, disclosing a self-erecting silo assembly requiring a multi-stage telescoping hydraulic cylinder which, when extended, was so long that it was likely to be bent by the lateral force components inevitably imposed upon it.

Employment of a winch for raising the bin presents a different but equally difficult problem. As can be seen from the above discussed Brock patent, the winch cable must be trained over the top of a sturdy mast or post in order to translate pull on the cable into a lifting force on the bin. The mast or post functions only when the silo is set up and taken down, and at all other times it tends to be a nuisance, taking up valuable space on the trailer bed and increasing the transport weight of the assembly.

SUMMARY OF THE INVENTION

The general object of the present invention is to provide a portable self-erecting surge storage silo assembly which can be mounted on a single frame that can comprise a trailer unit, having a substantially large capacity bin of heavy duty construction and a conveyor elevator which is likewise of desirable heavy duty construction, said assembly being so arranged that the bin has its axis horizontal when it is in its transport position, to thus have a minimum height which allows the assembly, when transported along the highways, to pass under standard height bridges and underpasses.

Another and more specific object of this invention is to provide a portable self-erecting surge storage silo assembly of the character described wherein lifting and controlled lowering of the bin and conveyor elevator are effected by hydraulic cylinder jacks having a reasonably short extended length.

It is also an object of this invention to provide a portable self-erecting surge storage silo of the character described that can be set up and taken down quickly and with a minimum of personnel.

In general these and other objects of the invention that will appear as the description proceeds are achieved in the self-erecting portable surge storage silo of this invention, which comprises a bin for storage of paving mix and the like, a conveyor elevator whereby material is carried up over the bin to be filled into it, and a rigid horizontally elongated base frame. The bin has front and rear sides which are respectively spaced to the front and rear of a bin axis, a top end, and a bottom end that is spaced along said bin axis in a downward direction from the top end. The bin is supported on the base frame in an erected position with its said bin axis upright and its bottom end elevated and is also supported thereon in a transport position wherein said bin axis is substantially horizontal and the bin has its rear side uppermost and its top end near one end of said frame. The conveyor elevator comprises an elongated elevator frame that has charging and discharge ends and has, near its charging end, a pivot connection with the base frame, near the other end of the latter, about which the elevator is swingable between an upwardly inclined operating position wherein its discharge end is over the top of the erected bin and a transport position which the elevator occupies when the bin is in its transport position and wherein the elevator lengthwise horizontally overlies the base frame with its discharge end near the bottom end of the bin.

The silo assembly of this invention is characterized by rear connection means fixed on the base frame and defining a horizontal rear bin swinging axis which is transverse to the bin axis and the base frame and intermediate the ends of the base frame. Elongated rear bin supporting means rigidly secured to the bin has on a bottom end thereof a connector element that is spaced to the rear of the bin axis and is spaced a first distance in said downward direction from the bottom end of the bin, said connector element being detachably pivotably connectable to said rear connection means to constrain the bin to swinging about said rear bin swinging axis between its erected position and an intermediate position wherein the bin axis is inclined upwardly and towards said one end of the base frame and whereat said connector element is connectable to and disconnectable from the rear connection means. A front connection means fixed on the base frame defines a front bin swinging axis which is parallel to the rear bin swinging axis and is spaced therefrom towards said one end of the base frame. First front bin supporting means for rigid but detachable securement to the bin provides a first alternatively selectable connection between the bin and said front connection means whereby the bottom end of the bin is spaced from said front bin swinging axis by a second distance which is smaller than said first distance, and whereby the bin is constrained to swing about the front bin swinging axis between its transport and intermediate positions and is confined in its intermediate position by connection of said connector element to the rear connection means. Second front bin supporting means for rigid but detachable securement to the bin provides a second alternatively selectable connection between the bin and said front connection means whereby the bottom end of the bin is spaced from the front bin swinging axis by substantially said first distance and the bin is confined in its erected position in cooperation with the rear bin supporting means in its connection to the rear connection means. Axially extensible and retractable cylinder jack means for raising the elevator to its operative position and controlling its descent to its transport position has an upper end pivotally connected to the elevator frame, intermediate the ends thereof, and has a lower end pivotally connected to the base frame between said other end thereof and said front connection means. An elongated tension member that has upper and lower ends has its upper end connected to the elevator frame intermediate the discharge end thereof and the connection thereto of said upper end of the cylinder jack means. There are rear and front anchorages on the bin, near its said bottom end, to which the lower end of the tension member is alternatively and detachably securable, the rear anchorage being spaced a substantial distance to the rear of said bin axis so that by securement of the tension member thereto the bin can be swung from its transport to its intermediate position by raising the elevator towards its operative position, and the front anchorage being substantially nearer the bin axis than the rear anchorage so that the bin can be swung from its intermediate to its erected position by again raising the elevator frame.

BRIEF DESCRIPTION OF DRAWINGS

In the accompanying drawings, which illustrate what is now regarded as preferred embodiment of the invention.

DETAILED DESCRIPTION OF PREFERRED EMBODIMENT OF THE INVENTION

A surge storage silo assembly of this invention comprises an elongated horizontally extending base frame 5 which preferably has a set of wheels 6 at a rear end thereof and a conventional gooseneck hitch 7 at its front end, so that it can be towed as a trailer for highway transport. The assembly further comprises a generally cylindrical bin 9 in which asphalt paving mix can be stored and a conveyor elevator 10 whereby paving mix can be delivered into the bin through an inlet 11 in its top.

The bin 9 is preferably cylindrical but it is in any case substantially symmetrical to a bin axis BA which extends through its top end 12 and its bottom end 13; hence the bottom end 13 can be regarded as spaced along that axis BA in a downward direction from the top end 12. The bin also has a front side 14 and a rear side 15, which are respectively spaced to the front of the bin axis BA and to the rear of it.

Figure 1:
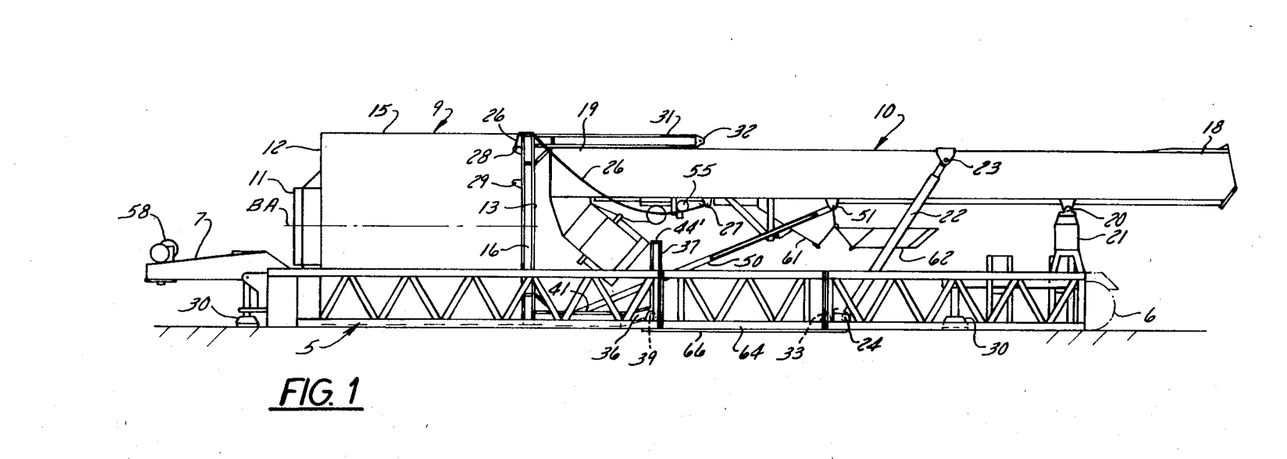
FIG. 1 is a view in side elevation of the surge storage silo assembly of this invention with its bin and elevator in their transport positions.
Figure 2:
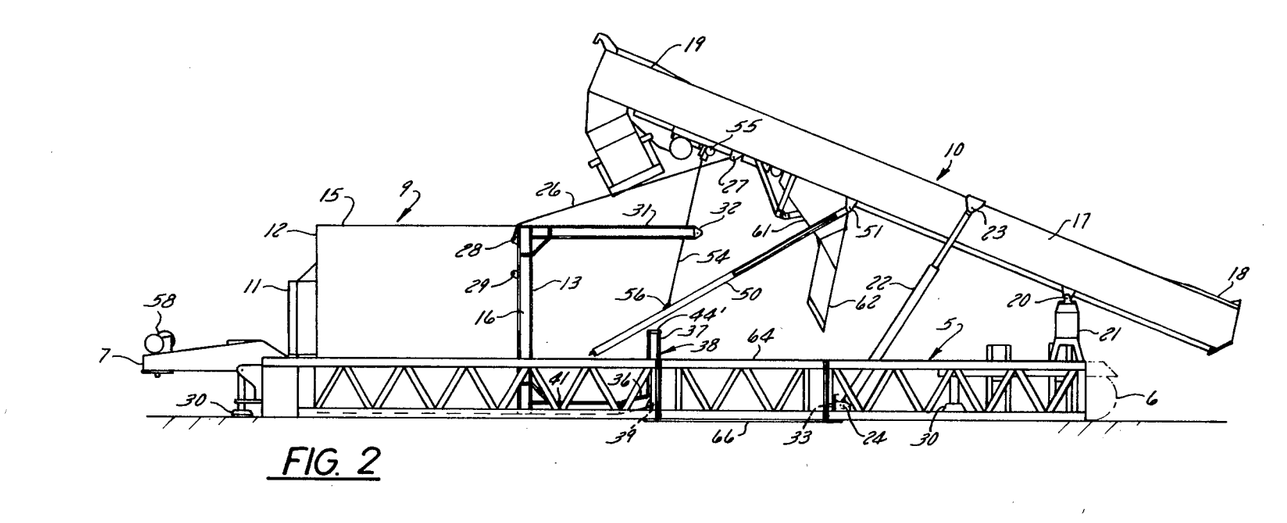
FIGS. 2 and 3 are views generally like FIG. 1 but respectively showing conditions in an initial stage of the erecting operation and in a directly subsequent stage in which the bin has been brought to its intermediate position.
Figure 6:
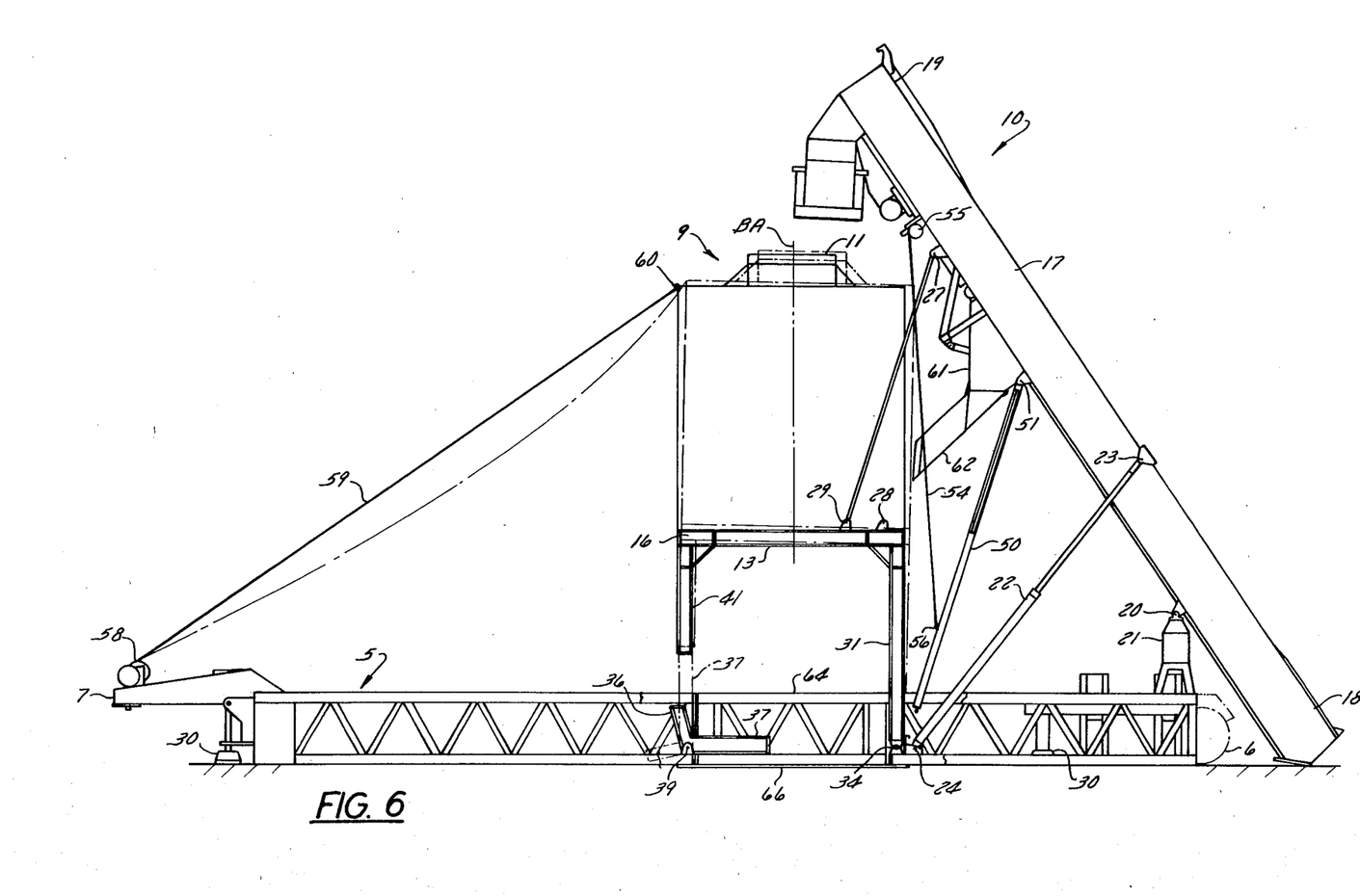
FIG. 6 is a view generally like FIG. 5 but showing conditions at the time the bin has just been brought to its erected position.
Figures 7, 8:
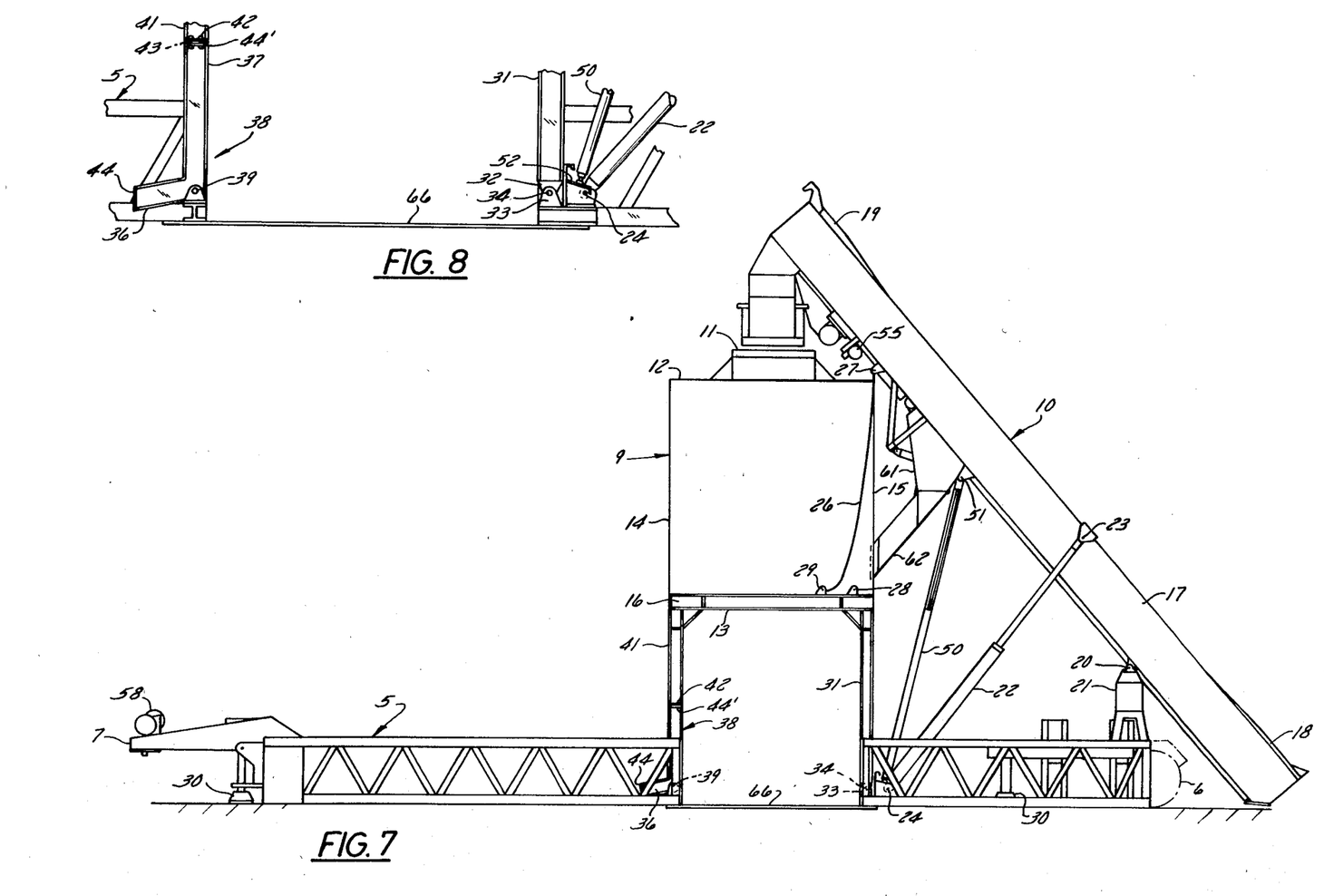
FIG. 7 is a view generally like FIGS. 5 and 6 but showing the assembly in its fully operative condition.
FIG. 8 is a view generally like FIG. 4 but showing the medial portion of the base frame with the apparatus in fully operative condition.

In a transport position of the bin, in which it is shown in FIGS. 1 and 2, it is supported on the base frame 5 with its axis BA extending substantially horizontally, with its rear side 15 uppermost, and with its top end 12 at the front end of the base frame. In an erected position of the bin, in which it is shown in FIGS. 6 and 7, it is supported on the base frame 5 with its axis BA upright, its rear side 15 facing toward the rear end of the base frame, and its bottom end 13 at a substantial elevation such that a dump vehicle (not shown) can be driven under it for loading.

The bin itself can be generally conventional, and therefore details of it are not shown, such as a closure for its inlet 11 and bottom gates through which its contents are discharged. At its bottom the bin is secured to a sturdy bin frame 16 which is square in plan view and to which legs are attached, as described below, whereby the bin is supported in its erected position.

The conveyor elevator 10 is likewise conventional in itself. It comprises an elongated rigid frame 17 along which there extends an endless slat conveyor (not shown) whereby material to be stored in the bin is carried up and dropped down into the bin inlet 11. The elevator thus has a charging end 18 at which material is delivered onto it and a discharge end 19 from which the elevated material is fed into the bin.

Near its charging end 18, but spaced a short distance therefrom, the elevator frame 17 has a pivot connection 20 with the base frame 5, near the rear end of the latter. As shown, the pivot connection 20 is at the top of a low, upwardly projecting supporting structure 21 that is rigidly fixed on the base frame 5 to comprise, in effect, a part of that frame. The pivot connection 20 defines a fixed horizontal axis which extends transversely to the lengths of the base frame 5 and to the elevator frame 17 and about which the elevator frame is swingable between a transport position in which it is shown in FIG. 1 and an operative position in which it is shown in FIG. 7. In its transport position the elevator extends lengthwise substantially horizontally, overlying the base frame 5 with its discharge end 19 rearwardly adjacent to the bottom end 13 of the bin 9, the bin being always in its transport position whenever the elevator is brought to or maintained in its transport position. In its operative position the elevator is inclined forwardly and upwardly relative to the base frame to have its charging end 18 near ground level and its discharge end 19 over the top end 12 of the erected bin. Preferably the elevator is swingable upwardly a little beyond its operative position, to its position shown in FIG. 6.

The elevator is swung up and controlledly lowered by axially extensible and retractable cylinder jack means 22 connected between it and the base frame 5. Preferably the cylinder jack means 22 comprises a pair of hydraulic cylinders (single acting cylinders can be used) which have their axes parallel and which are connected to the elevator frame 17 at laterally opposite sides thereof. The cylinder jack means 22 has an upper pivot connection 23 to the elevator frame and a lower pivot connection 24 to the base frame 5, the axes defined by those connections being parallel to the axis defined by the pivot 20 about which the elevator swings.

The upper jack means pivot connection 23 is spaced along the elevator frame, in the direction towards its discharge end 19, to be at one distance from the elevator swinging connection 20; and the lower jack means pivot connection 24 is at a somewhat greater distance forwardly along the base frame 5 from that swinging connection 20; hence the jack means 22 always has its axis at a rearward and upward inclination to the base frame. The upper jack connection 23 is close enough to the elevator pivot 20 to allow suitably short stroke cylinder jacks to be used.

As the description proceeds it will be seen that the bin 9 is raised from its transport position to its erected position in two stages, and in each stage it is raised by lifting force which the jack means 22 applies to the elevator to swing the latter upward. That lifting force is transmitted to the bin by means of an elongated tension member 26 which can comprise a chain or a cable. At its upper end the tension member has a fixed connection 27 to the elevator frame, and its lower end is detachably and alternatively connectable to either a rear anchorage 28 or a front anchorage 29 on the bin, preferably fixed on the bin frame 16. The tension member 26 is preferably duplicated, that is, there is a chain or cable extending down from each side of the elevator frame 17, and the anchorages 28 and 29 are likewise duplicated, at both sides of the bin.

When the apparatus is to be erected, the ground at the site is worked to a flat, level condition. The wheels 6 are retracted with the aid of hydraulically extensible and retractable outriggers 30 that are located at the four corners of the base frame 5, and the base frame is thus brought to rest flatwise on the prepared ground. It will be apparent that the apparatus of this invention could be transported on two separate trailer units, each somewhat shorter than the one here shown, one carrying the bin 9 and the other carrying the elevator 10 and the jack means 22, and these two units would be rigidly connected end-to-end at the site to comprise the base frame 5.

Figures 3, 4:
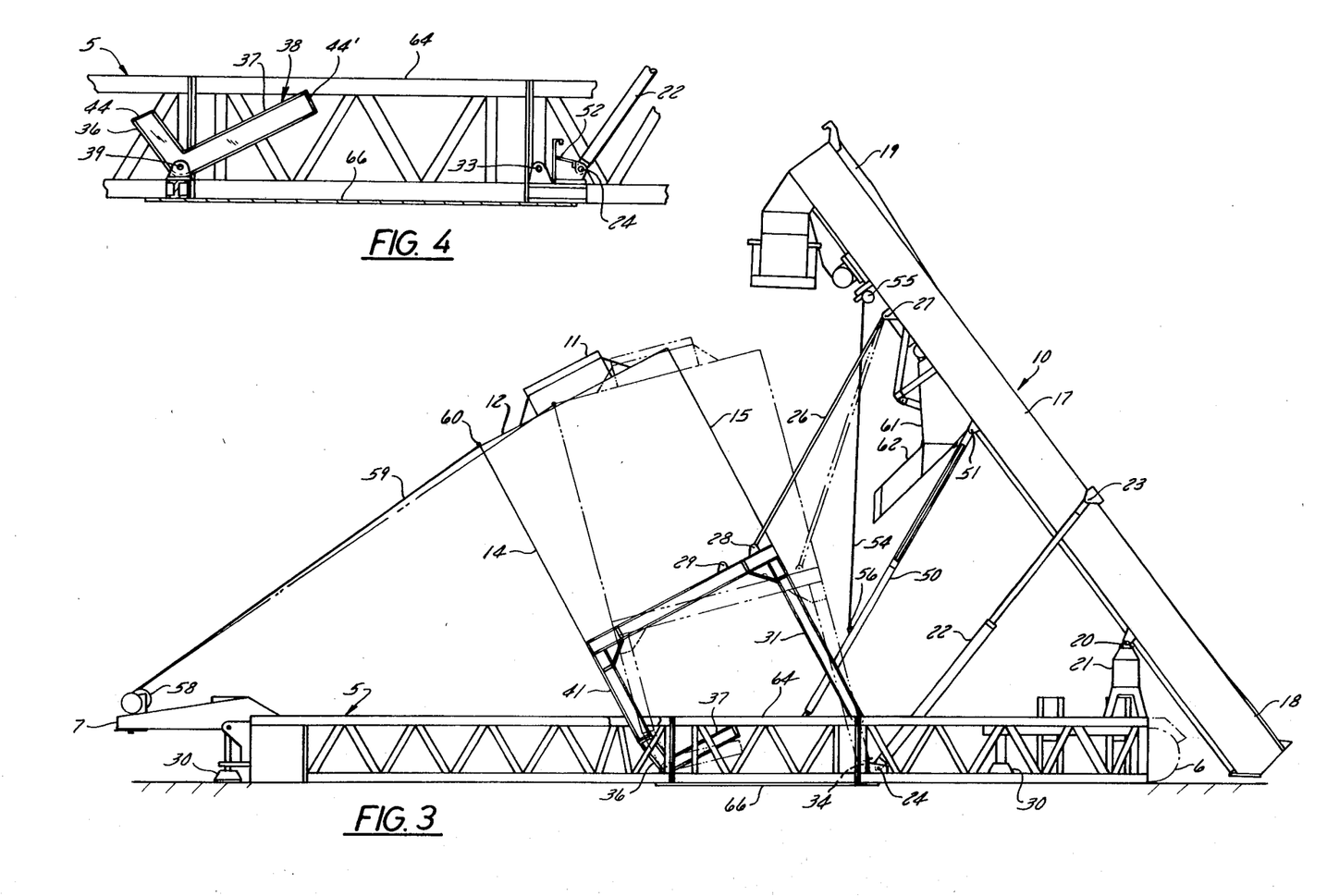
FIG. 4 is a detail view in side elevation, on an enlarged scale, of the medial portion of the base frame.
Figure 5:
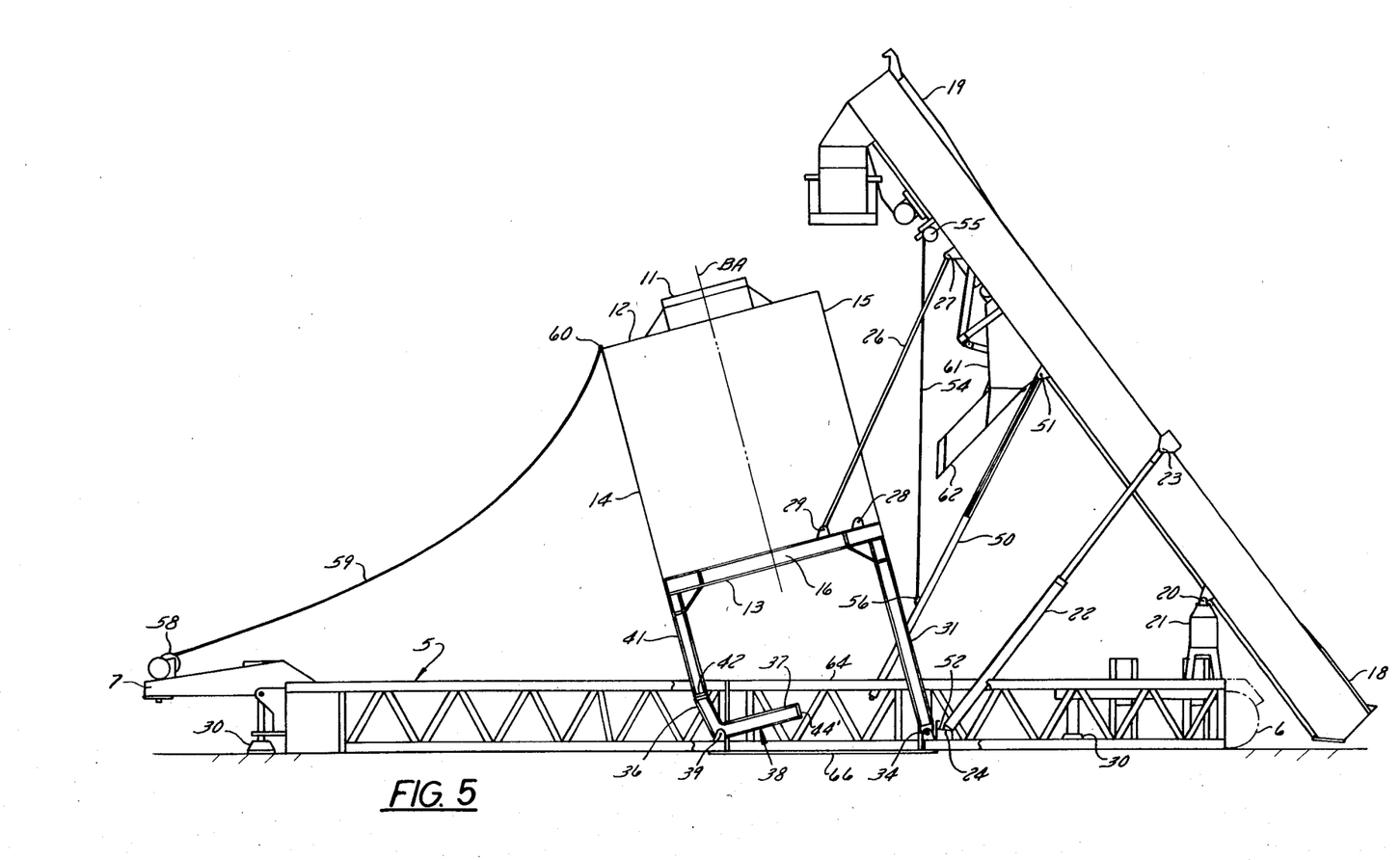
FIG. 5 is a view generally like FIG. 3 but showing the tension member reconnected to the front anchorage on the bin in preparation for raising the bin from its intermediate position (in which it is shown) to its erected position.

In the first stage of bin erection, illustrated by FIGS. 1-3, the elevator is raised from its transport position to approximately its operative position, with the tension member 26 connected to the rear anchorage 28 on the bin, and the bin is thereby swung up from its transport position (FIG. 1) to an intermediate position (FIGS. 3 and 5) wherein the bin axis BA is at a forward and upward inclination to the base frame. As explained hereinafter, the bin has detachable connections with the base frame whereby it can be temporarily fixed in its intermediate position; and when it has been so fixed the elevator is partway lowered to slacken the tension member 26, which is then reconnected to the front anchorage 29 on the bin, whereupon the elevator frame is again swung upward to raise the bin to its erected position.

The means for normally supporting the bin in its erected position comprises an elongated rear bin supporting means 31 that is rigidly secured to the bin and projects from its bottom end in the downward direction relative to the bin itself. As shown and as preferred, the rear support means 31 comprises a pair of straight legs, one at each side of the bin, which extend parallel to the bin axis BA and which are permanently attached to the front corners of the square bin frame 16. At its bottom the rear bin supporting means 31 has a connector element 32 which is detachably securable to a rear connection means 33 that is fixed on the base frame. In this case the connector element 32 comprises a hole near the bottom of each of the legs that comprise the rear bin supporting means, said holes in the two legs being coaxial; and the rear connection means 33 comprises upwardly projecting lugs fixed on the base frame, at each side of it, which also have coaxial holes. When the connector element holes 32 in the legs 31 are coaxially aligned with the holes in the rear connection means 33 on the base frame, pins 34 are axially receivable in those registering holes to provide a detachable rear connection between the bin and the base frame. The pins 34, in their connections to the base frame, define a fixed horizontal rear bin swinging axis that is parallel to the elevator swinging axis defined by the pivot connection 20 between the elevator frame 17 and the base frame 5. The bin swings about this rear bin swinging axis between its intermediate position and its erected position, as can be seen from a comparison of FIGS. 5 and 6. Preferably the rear connection means 33 on the base frame is located forwardly adjacent to the lower cylinder jack pivot connection 24.

The coaxial pins 34 that provide the detachable rear connection between the base frame and the bin are preferably actuated by hydraulic pin pullers, one at each side of the base frame. Such devices are well known and therefore are not shown.

Between its transport position and its intermediate position the bin swings about a horizontal front bin swinging axis which is parallel to the rear bin swinging axis defined by the pins 34 and which is spaced forwardly along the base frame from it. To connect the bin with the base frame for swinging about the front bin swinging axis there is a first front bin supporting means 36 that is rigidly but detachably securable to the bin, and to cooperate with the rear bin supporting means 31 in supporting the bin in its erected position there is a second front bin supporting means 37, also rigidly but detachably securable to the bin. The first front bin supporting means 36 and the second front bin supporting means 37 are securable to the bin alternatively, and as here shown they respectively comprise a short leg and a long leg of an L-shaped unit generally designated 38. That unit 38 is permanently pivoted to the base frame at the junction of its legs, as by means of a shaft 39 that comprises a front connection means on the base frame and defines the front bin swinging axis. Preferably the L-shaped unit 38 is duplicated, that is, there is one at each side of the base frame, each having both of its legs 36, 37 substantially contained in a vertical plane which is normal to the bin swinging axes. To provide for the alternative connection of the legs 36, 37 to the bin, a pair of downwardly projecting stub legs 41 are rigidly fixed to the bin, one at each side of it. These stub legs, which preferably have permanent connections to the front corners of the square bin frame 16, extend lengthwise parallel to the bin axis BA and are spaced to the front of that axis. To the bottom end of each of the stub legs 41—that is, at its end remote from the bin—there is fixed a flat plate-like pad 42 which has its surfaces normal to the length of the stub leg and in which there are holes for receiving bolts 43. Fixed on the free outer end of each of the legs 36, 37 of the L-shaped unit there is a similar plate-like pad 44, 44', respectively, that is flatwise engageable with the pad 42 on a stub leg and has bolt holes which align with those in the stub leg pad 42.

When the bin is in its transport position, and in all positions between the transport position and its intermediate position, the stub legs 41 are attached by means of the bolts 43 to the shorter legs 36 of the L-shaped units, to be rigidly connected to those shorter legs more or less in lengthwise alignment with them. The shorter legs 36, which comprise the first front bin supporting means, thus cooperate with the stub legs to confine the bin to swinging about the front bin swinging axis defined by the shaft 39 and to dispose the bottom end 13 of the bin at a distance from that axis which is substantially shorter than the distance from the bottom end of the bin to the connector element 32 at the bottom of the rear bin supporting means 31. Because of this difference in distances, the connector element 32 is connectable to and disconnectable from the rear connection means 33 on the base frame when the bin is connected with the first front bin support means 36 and is in its intermediate position.

Thus during the erection procedure, when the bin has been swung up to its intermediate position, the pins 34 are installed to connect the rear bin supporting means 31 to the rear connection means 33 and thus to the base frame. The bin then has stable support in its intermediate position, as is apparent from FIG. 5. With the bin so stabilized, the elevator frame is lowered partway to its transport position, to slacken the tension member 26 and allow its lower end to be disconnected from the rear anchorage 28 and reconnected to the front anchorage 29. The elevator frame is then raised by the amount necessary to put the tension member 26 under a slight tension. The bolts 43 are then removed to disconnect the short legs 36 from the stub legs 41, whereupon the bin will be supported in its intermediate position by the rear bin supporting means 31 in cooperation with the jack means 22, the latter of course being connected with the bin through the elevator frame 17 and the tension member 26.

It will be noted that the legs 36 and 37 of each L-shaped unit are so oriented that when the shorter leg 36 projects upwardly, the longer leg 37 projects rearwardly relative to the base frame. After the short legs 36 have been detached from the stub legs 41, the elevator is again raised to swing the bin up from its intermediate position to a little beyond its erected position. At that point the two L-shaped units 38 are swung about their shafts 39 to bring their longer legs 37 to their upright positions. The elevator frame is then lowered slightly, to bring the bin back down to its erected position at which the respective pads, 42, 44' are flatwise engaged. These pads are connected by means of the bolts 43, and the long legs 37 of the L-shaped units, which comprise the second front bin supporting means, are thereby rigidly connected to the stub legs 41, in lengthwise alignment with them, to establish the second alternatively selectable connection between the bin and the front connection means 39. The distance from the bottom end of the bin to the front connection means 39 is then equal to the distance from the bottom end of the bin to the rear connection means 33, and the bin has firm and stable support in its erected position.

The elevator frame, 17 is preferably not supported in its operative position by the bin itself, nor is the jack means 22 relied upon to maintain it in that position. Instead, it is supported by a rigid brace 50 that extends obliquely downward and forward from it to the base frame. Preferably the brace 50 has at its upper end a permanent pivot connection 51 to the elevator frame, about midway between its charging and discharge ends, and the lower end of the brace is received in a upwardly opening socket 52 in the base frame. The connection 51 between the brace 50 and the elevator frame is a pivotal one so that as the elevator is lowered to its transport position, the lower end of the brace can be swung forward to bring the brace to a more nearly horizontal attitude in which it underlies the elevator and overlies the base frame, as shown in FIG. 1. Because the brace 50 is a heavy one, the angle of its forward and downward inclination is controlled by means of a cable 54 which has a free end anchored to the brace, as at 56, intermediate its top and bottom ends, and which is connected with a small winch 55 that is mounted on the elevator frame. The winch 55 is in this case located at a small distance from the discharge end of the elevator frame and is preferably hydraulically driven so as to be remotely controllable by an operator standing on the ground.

The attitude of the bin when it is in its intermediate position is so chosen in relation to its center of gravity that the bin passes through an overcenter position as it is swung up from its transport position to the intermediate position, and preferably just before it reaches the intermediate position; hence gravity tends to swing the bin from the intermediate position to the erected position. To control swinging of the bin in the final stage of movement to its erected position, and for swinging the bin back from its erected position to its intermediate position, a small winch 58 is mounted on the hitching gooseneck 7 at the front of the base frame, and a cable 59 extends from that winch to an anchorage 60 at the top of the bin. Since the winch 58 is readily accessible, and the swinging moments to be controlled by it are not unduly large, it can be manually operated. The cable 59 can be detached from its bin anchorage 60 and wound up onto the winch 58 when the bin has been erected.

As here shown the elevator is equipped with a reject chute 61 that has a spout 62 which folds toward the elevator frame for storage and which is lowered to its operative position and pinned there during an initial stage of raising of the elevator (compare FIGS. 1 and 2).

When the bin is fully erected, detachable gate-like sections 64 of the base frame, at opposite sides of it, are removed (compare FIGS. 6 and 7) to permit dump vehicles to pass under the bin between its front and rear supporting means. The bottom of the base frame, through the portion of it at which the removable sections 64 are installed, comprises a flat plate 66 over which the dump vehicles ride in passing under the bin.

It will be observed that when the bin is in its erected position the shorter legs 36 of the L-shaped units 38 project forwardly along the bottom of the base frame, away from the passage under the bin, to be completely out of the way.

The procedure for restoring the assembly to its transport relationship (FIG. 1) is of course essentially the reverse of the above described erection procedure.

From the foregoing description taken with the accompanying drawings it will be apparent that this invention provides a portable self-erecting surge storage silo assembly that comprises a heavy duty bin, a heavy duty conveyor elevator and a base frame upon which both the bin and the elevator are supported in their operative relationship as well as in their transport positions and which serves as a trailer whereby the assembly can be transported along the highways. It will also be apparent that the silo assembly of this invention comprises a large capacity bin but can nevertheless pass under standard height bridges and overpasses when transported along a highway, and that the assembly comprises relatively short cylinder jack means for raising the bin and elevator, even though the bin must be lifted through a substantial distance to bring it from its horizontal transport position to its erected position.

What is claimed as the invention is:

1. A self-erecting portable surge storage silo assembly comprising a bin for storage of paving mix and the like that has front and rear sides which are respectively spaced to the front and to the rear of a bin axis, a top end, and a bottom end spaced in a downward direction along said bin axis from the top end, a horizontally elongated base frame upon which the bin is supported in an erected position with said bin axis upright and its bottom end elevated and is also supported in a transport position wherein said bin axis is substantially horizontal and the bin has its rear side uppermost and its top end near one end of said frame, and a conveyor elevator comprising an elongated elevator frame that has charging and discharge ends and has, near its charging end, a pivot connection with the base frame, near the other end of the same, about which the elevator is swingable between an upwardly inclined operating position wherein its discharge end is over the top of the erected bin and a transport position which the elevator occupies when the bin is in its transport position and wherein the elevator lengthwise horizontally overlies the base frame with its discharge end near the bottom end of the bin, said silo assembly being characterized by:

A. rear connection means fixed on the base frame, defining a horizontal rear bin swinging axis which is transverse to the bin axis and to the base frame and is intermediate the ends of the base frame;

B. elongated rear bin supporting means rigidly secured to the bin and having on a bottom end thereof a connector element that is spaced to the rear of the bin axis and is spaced a first distance in said downward direction from the bottom end of the bin, said connector element being detachably pivotably connectable to said rear connection means to constrain the bin to swinging about said rear bin swinging axis between its erected position and an intermediate position wherein the bin axis is inclined upwardly and towards said one end of the base frame and whereat said connector element is connectable to and disconnectable from the rear connection means;

C. front connection means fixed on the base frame defining a front bin swinging axis which is parallel to the rear bin swinging axis and is spaced therefrom towards said one end of the base frame;

D. first front bin supporting means for rigid but detachable securement to the bin to provide a first alternatively selectable connection between the bin and said front connection means whereby
  (1) the bottom end of the bin is spaced from said front bin swinging axis by a second distance which is smaller than said first distance,
  (2) the bin is constrained to swing about the front bin swinging axis between its transport and intermediate positions, and
  (3) the bin is confined in its intermediate position by connection of said connector element to the rear connections means;

E. second front bin supporting means for rigid but detachable securement to the bin to provide a second alternatively selectable connection between the bin and said front connection means whereby
  (1) the bottom end of the bin is spaced from the front bin swinging axis by substantially said first distance and
  (2) the bin is confined in its erected position in cooperation with the rear bin supporting means in its connection to the rear connection means;

F. axially extensible and retractable cylinder jack means for raising the elevator to its operative position and controlling its descent to its transport position, said cylinder jack means having an upper end pivotally connected to the elevator frame, intermediate the ends thereof, and having a lower end pivotally connected to the base frame between said other end thereof and said front connection means;

G. an elongated tension member having upper and lower ends and having its upper end connected to the elevator frame intermediate the discharge end thereof and the connection thereto of said upper end of the cylinder jack means; and H. rear and front anchorages on the bin, near said bottom end thereof, to which the lower end of the tension member is alternatively and detachably securable,
   (1) the rear anchorage being spaced a substantial distance to the rear of said bin axis so that by securement of the tension member thereto the bin can be swung from its transport to its intermediate position by raising the elevator, and
   (2) the front anchorage being substantially nearer the bin axis than the rear anchorage so that the bin can be swung from its intermediate to its erected position by again raising the elevator frame.

2. The silo assembly of claim 1, further characterized by:
   I. a rigid brace having connections at opposite ends thereof with the base frame and with the elevator frame, respectively, whereby the elevator is supported in its operative position, one of the last mentioned connections being a readily detachable one.

3. The silo assembly of claim 1, wherein:
   (1) said first front bin supporting means comprises a short leg of a substantially L-shaped unit,
   (2) said second front bin supporting means comprises a long leg of said substantially L-shaped unit, and
   (3) said front connection means comprises a shaft which extends through said unit substantially at the junction of said legs and about which the unit is swingable.

4. A self-erecting portable surge storage silo assembly comprising a bin for storage of paving mix and the like that has front and rear sides which are respectively spaced to the front and to the rear of a bin axis, a top end, and a bottom end spaced in a downward direction along said bin axis from the top end, and a horizontally elongated base frame upon which the bin is supported in an ereced position with said bin axis upright and its bottom end elevated and is also supported in a transport position wherein said bin axis is substantially horizontal and the bin has its rear side uppermost and its top end near one end of the base frame, said silo assembly being characterized by:
   A. the bin having rigidly secured thereto
      (1) a pair of elongated rear legs which project from the bin in said downward direction, extend lengthwise substantially parallel to said bin axis, and are spaced to the rear of the bin axis, and
      (2) a pair of substantially shorter front legs which project from the bin in said downward direction, extend lengthwise substantially parallel to said bin axis, and are spaced forwardly from the bin axis;
   B. a pair of substantially L-shaped units, one for each of said front legs, each said unit having a longer leg and a shorter leg;
   C. front connection means fixed on the base frame and connected with each of said units, defining a front horizontal bin swinging axis which is transverse to the length of the base frame and to the bin axis and extends substantially through the junction of the legs of each said unit, each said unit being swingable about that bin swinging axis with its legs substantially contained in a plane normal thereto;
   D. means for rigidly but readily detachably connecting each of said front legs with said shorter leg of its L-shaped unit, substantially in lengthwise alignment therewith, to provide for swinging of the bin about said front bin swinging axis between its transport position and an intermediate position wherein the bin axis is inclined upwardly and towards said one end of the base frame;
   E. rear connection means fixed on the base frame defining a rear bin swinging axis which is parallel to said front bin swinging axis and which is spaced horizontally therefrom towards the other end of the base frame;
   F. means engageable and disengageable when the bin is in its said intermediate position and providing when engaged a pivotal connection between said rear connection means and each of said rear legs, at the bottom thereof, whereby the bin is swingable about the rear bin swinging axis between its intermediate position and its erected position; and
   G. means for rigidly but readily detachably connecting each of said front legs with said longer leg of its L-shaped unit, substantially in longitudinal alignment therewith, for cooperation with the rear legs in supporting the bin in its erected position.

5. The portable surge storage silo assembly of claim 4, wherein an elongated conveyor elevator that has charging and discharging ends has, near its charging end, an elevator pivot connection with the base frame, near said other end thereof, about which the elevator frame is swingable between an upwardly inclined operating position wherein its discharge end is over the top of the erected bin and a transport position which the elevator occupies when the bin is in its transport position and wherein the elevator lengthwise overlies the base frame with its discharge end near the bottom end of the bin, further characterized by:
   H. axially extensible and retractable cylinder jack means for raising the elevator to its operative position and controlling its descent to its transport position, said cylinder jack means having
      (1) an upper end pivotally connected to the elevator frame intermediate the discharge end thereof and said elevator pivot connection, and
      (2) a lower end pivotally connected to the base frame:
   I. an elongaged tension member having upper and lower ends;
   J. anchorage means on the elevator frame to which the upper end of said tension member is connectable; and
   K. other anchorage means on the bin to which the lower end of said tension member is connectable for transmission to the bin of forces which the jack means exerts upon the elevator frame.

6. The portable storage silo assembly of claim 5 wherein one of said anchorage means comprises a pair of spaced apart anchorages to which the tension member is alternatively connectable and from each of which the tension member is readily disconnectable, so that the tension member can be connected to one of said anchorages for raising the bin from its transport to its intermediate position by raising the elevator frame and can be connected to the other of said anchorages for swinging the bin from its intermediate to its erected position by again raising the elevator frame.

* * * * *